United States Patent
Bloom

(10) Patent No.: US 6,637,626 B1
(45) Date of Patent: *Oct. 28, 2003

(54) PUMP DISPENSER HAVING ONE-PIECE PLASTIC SPRING AND GASKET

(75) Inventor: Kenneth S. Bloom, Jerry City, OH (US)

(73) Assignee: Owens-Illinois Closure Inc., Toledo, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 09/668,480

(22) Filed: Sep. 25, 2000

Related U.S. Application Data

(63) Continuation of application No. 09/298,596, filed on Apr. 23, 1999, now Pat. No. 6,123,236.

(51) Int. Cl.[7] ................................................. B67D 5/40
(52) U.S. Cl. ..................................... 222/383.1; 222/341
(58) Field of Search .......................... 222/383.1, 209, 222/340, 341; 239/333

(56) References Cited

U.S. PATENT DOCUMENTS

| | | | | | |
|---|---|---|---|---|---|
| 2,362,080 | A | * | 11/1944 | Martin | 222/321.9 |
| 3,685,739 | A | * | 8/1972 | Vanier | 239/333 |
| 3,761,022 | A | * | 9/1973 | Kondo | 239/333 |
| 3,840,157 | A | * | 10/1974 | Hellenkamp | 222/309 |
| 4,161,288 | A | * | 7/1979 | McKinney | 239/333 |
| 4,227,650 | A | * | 10/1980 | McKinney | 239/333 |
| 4,589,573 | A | * | 5/1986 | Tada | 222/153.13 |
| 5,114,052 | A | * | 5/1992 | Tiramani et al. | 222/207 |
| 5,518,377 | A | * | 5/1996 | Bougamont et al. | 417/446 |
| 6,123,236 | A | * | 9/2000 | Bloom | 222/341 |
| 6,364,175 | B2 | * | 4/2002 | Bloom | 222/383.1 |

* cited by examiner

Primary Examiner—Gene Mancene
Assistant Examiner—F. Nicolas

(57) ABSTRACT

A container-mounted pump dispenser having a body with a vertical cylinder and piston is provided with a one-piece spring/gasket. The spring/gasket is a resilient bowl-shaped spring attached at its lower end about the piston stem and at its upper end comprises an annular gasket to be squeezed between the dispenser mounting cap and the container finish.

2 Claims, 6 Drawing Sheets

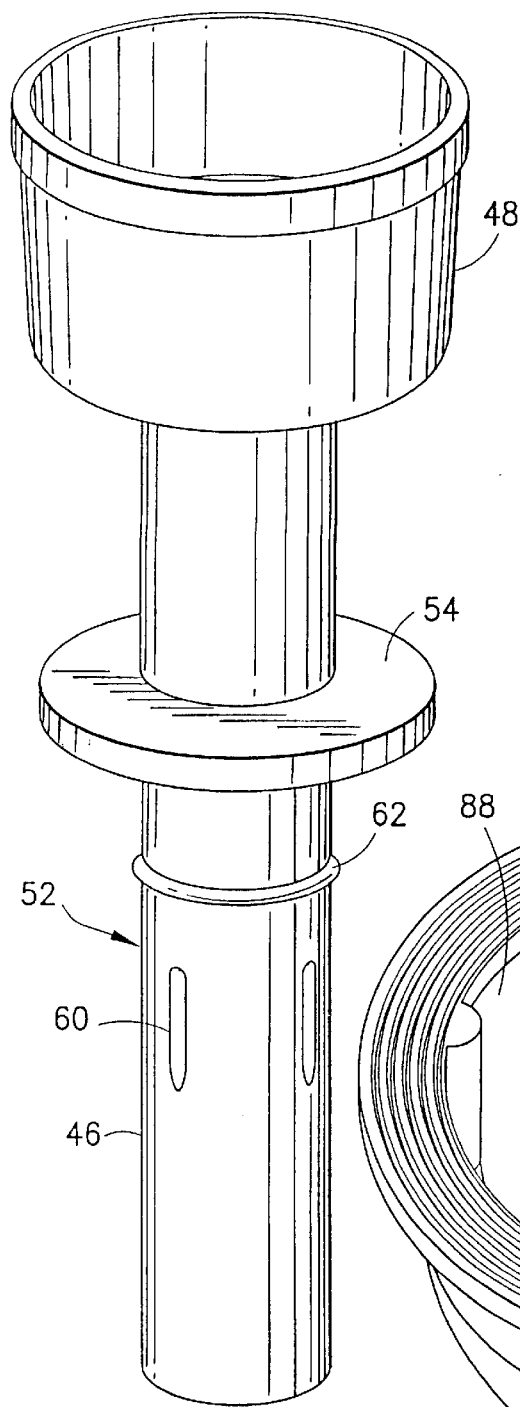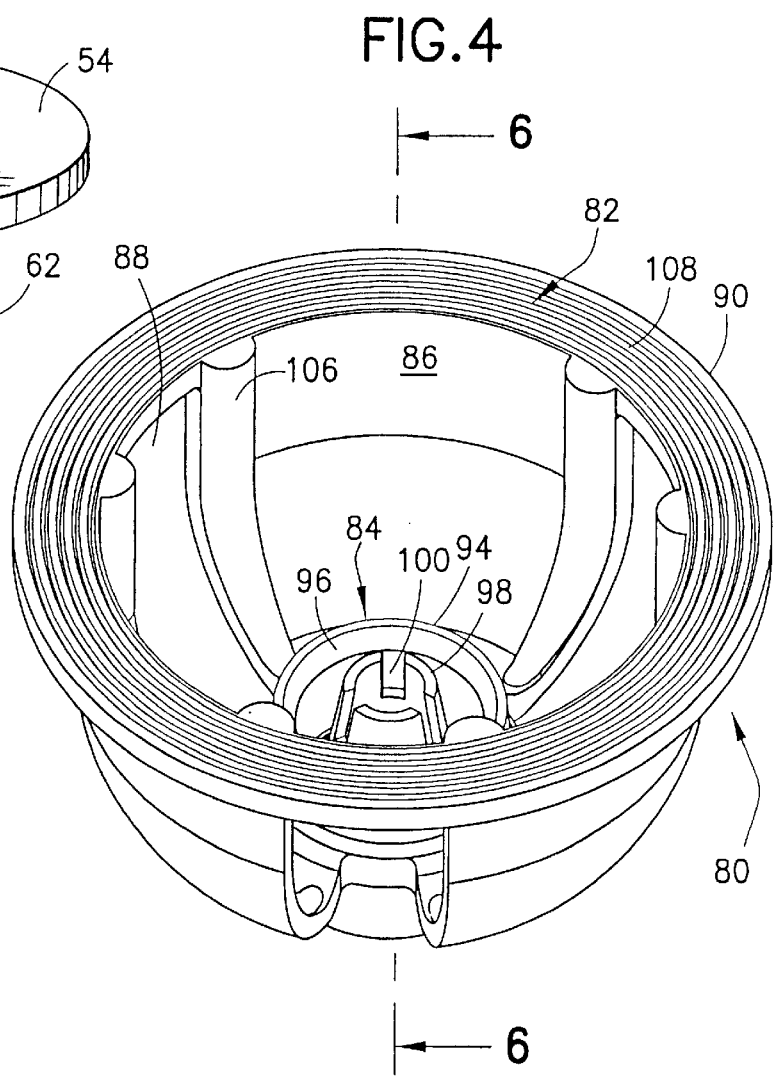
FIG.3
FIG.4

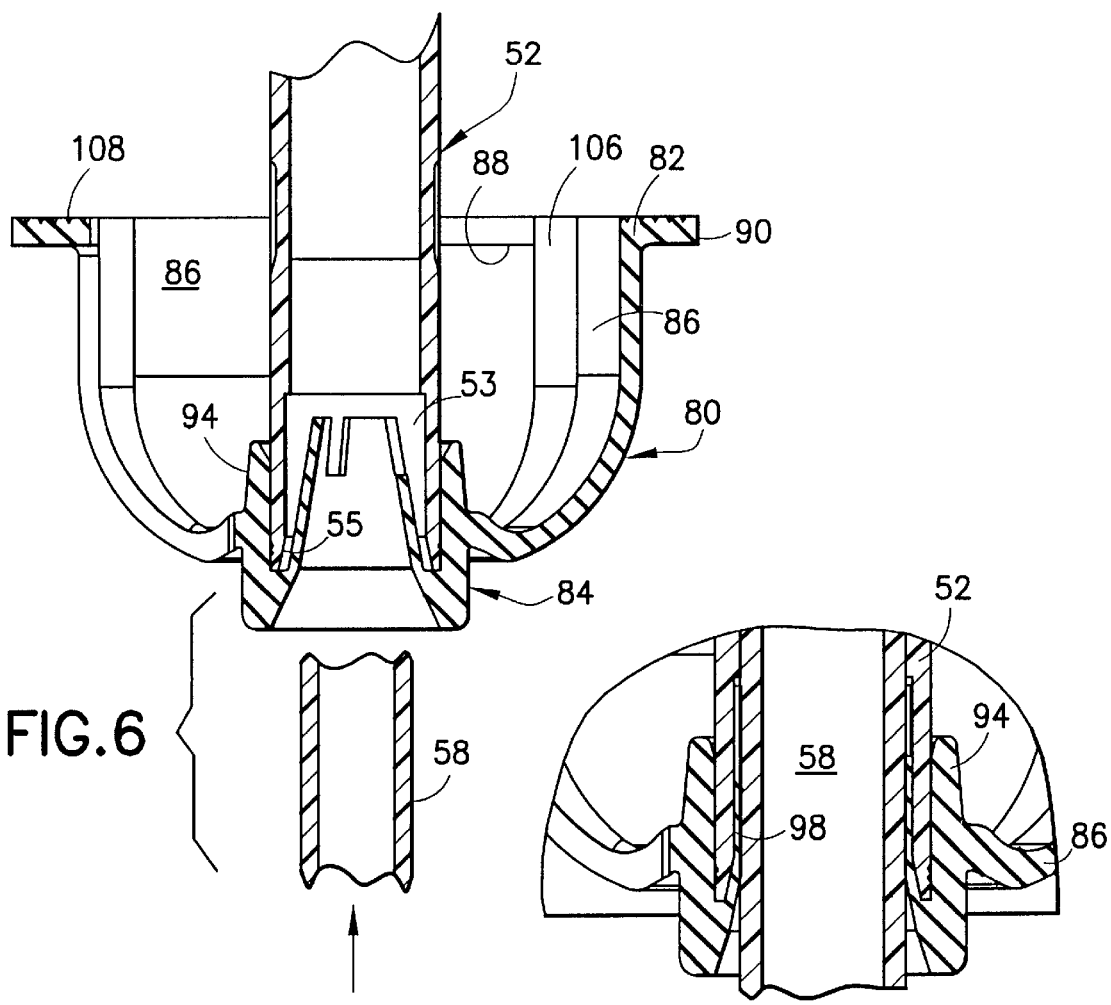
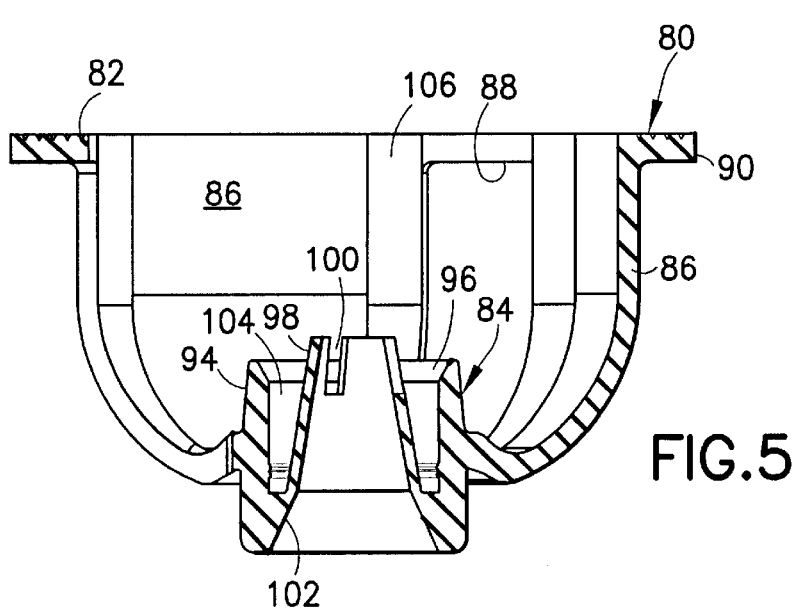

PUMP DISPENSER HAVING ONE-PIECE PLASTIC SPRING AND GASKET

CROSS-REFERENCE TO RELATED APPLICATION

This application is a continuation of Ser. No. 09/298,596 filed Apr. 23, 1999 now U.S. Pat. No. 6,123,236.

FIELD OF THE INVENTION

This invention relates to a pump dispenser having a one-piece plastic spring and gasket. More specifically, this invention relates a pump dispenser of the type having a vertically reciprocable piston such as is disclosed in the U.S. Pat. No. 4,161,288 to McKinney issued Jul. 17, 1979. In the practice of the invention such a pump dispenser is equipped with a one-piece plastic spring and gasket.

BACKGROUND OF THE INVENTION

The prior art has many showings of piston-type pump dispensers in which a metal spring is compressively disposed inside the cylinder, biasing the piston toward the position of maximum volume. The vertical pump shown in the McKinney patent above is a good example of such an arrangement.

In some pumps of the prior art where the liquid product being dispensed is corrosive as, for instance, bleach, the metal spring is in the cylinder with the liquid and subject to attack. For this reason some pumps of various types have moved the metal spring to the outside of the cylinder.

Rubber biasing members have been used. In U.S. Pat. No. 5,518,377 to Bougamont et al, for instance, a stretchable rubber membrane has an end attached to the piston and serves as a return spring for the piston, biasing the piston upward. It also serves as a seal for the pump chamber as well as an intake check valve.

In pump dispensers there has always been a concern with a leak-resistant mounting of the pump on the container. In some cases this has been dealt with by annular sealing walls which have engaged the inside of the container finish. Most, however, have provided a liner or separate annular gasket which have been squeezed between the top wall of the container closure and the top of the finish of the container as the closure is screwed down tight.

SUMMARY OF THE INVENTION

The present invention is, of course, defined in the claims. In summary, the invention is a pump dispenser having a mounting cap for mounting on a container and a vertical pumping cylinder receiving a piston. The piston has a downward tubular inlet stem adapted to extend reciprocably through the cap and into the container. A trigger is pivoted to the pump body and has a rearward arm to raise the piston. The improvement is a unitary bowl-shaped spring of resilient plastic surrounding the piston stem and comprising an upper, larger diameter ring disposed inside the cap and adapted to be clamped by the cap against the finish of the container and serve as a gasket. It also comprises a lower smaller diameter ring fastened to the piston stem, and at least a partial wall having its upper and lower ends connected to the upper and lower rings respectively.

BRIEF DESCRIPTION OF THE DRAWINGS

Further objects and features of the invention will be clear to those skilled in the art from a review of the following specification and drawings, all of which present non-limiting forms of the invention. In the drawings:

FIG. 3 is an enlarged perspective view of a piston useful in the invention;

FIG. 4 is an enlarged perspective view of the spring/gasket embodying the invention;

FIG. 5 is an enlarged sectional view of the spring/gasket;

FIG. 6 is a sectional view of a lower portion of the piston stem dip tube and the spring/gasket in the process of being assembled;

FIG. 7 is an enlarged portion of FIG. 1;

DESCRIPTION OF THE PREFERRED EMBODIMENT

Figure 1:
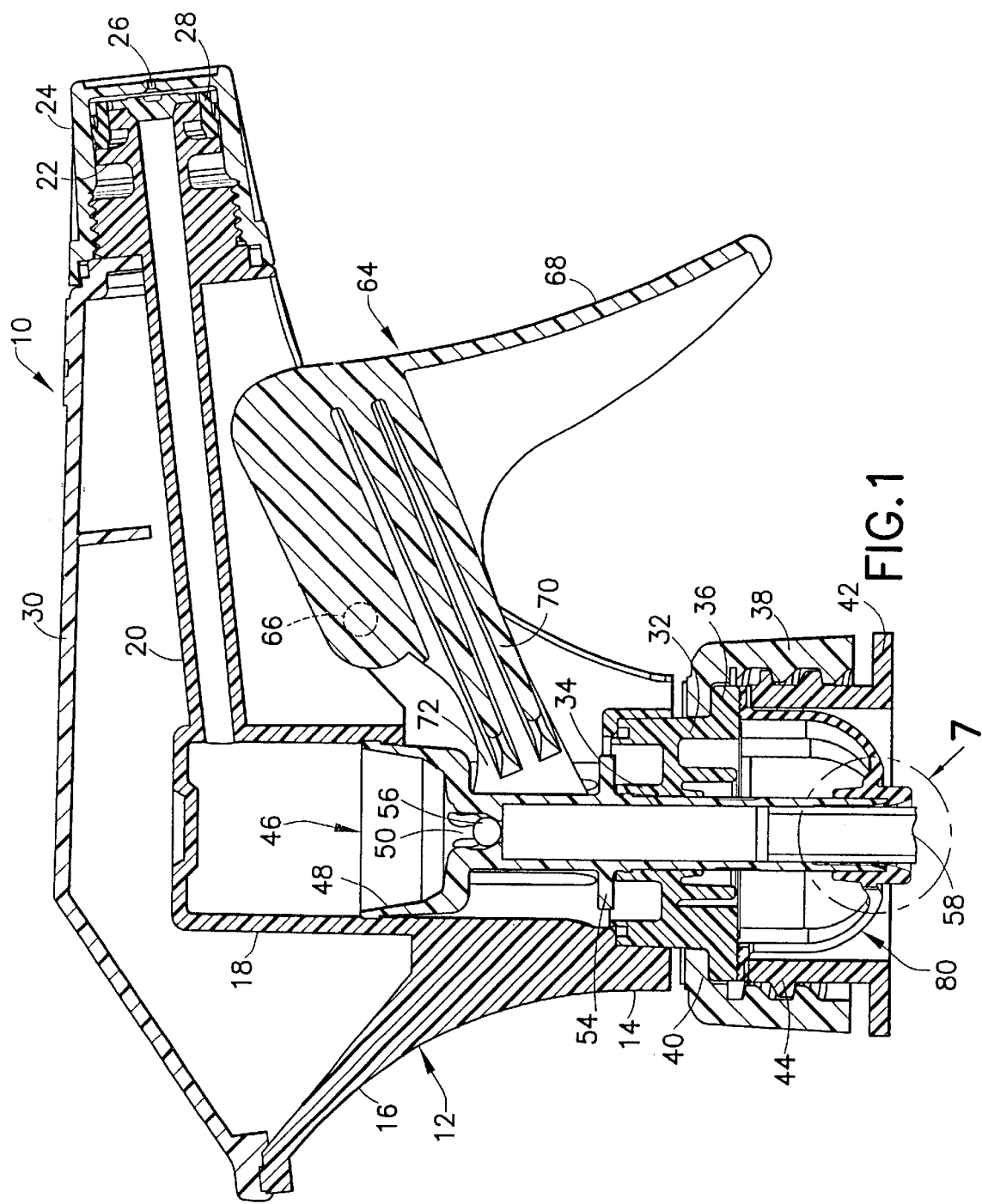
FIG. 1 is a sectional view through a pump dispenser embodying the invention.

A pump dispenser embodying the invention is shown in FIG. 1 and generally designated 10. It represents the best mode of practicing the invention. It is very generally of the type disclosed in the McKinney Pat. 4,161,288 mentioned above.

Briefly, it comprises a pump body 12 including a tubular support 14 having a lower housing portion 16 and an inverted cup-shaped cylinder 18. From an upper portion of the cylinder a delivery tube 20 extends rightward and ends in a nozzle fixture 22 onto which is threadedly received the nozzle cap 24. The nozzle cap is formed with an orifice 26, and a rubber outlet valve 28 covers the end of the fixture in the usual way.

An upper housing portion 30 is secured about its margin to the lower housing portion 16 and the two portions substantially cover the working parts of the pump dispenser. The lower end of the tubular support 14 is secured to the annular retainer 32. The retainer has a central sleeve 34 and an outward bottom flange 36. A screw cap 38 having a top wall with a central opening is assembled in rotatable fashion onto the retainer 32 and engages the upper side of the flange 36 of the retainer.

A container 42, partially shown, has a threaded finish 44. The screw cap 38 clamps the pump dispenser downward toward the top of the finish 44 when assembled on the container 42.

A piston 46 including cup 48 is sealingly disposed in the cylinder 18 and integrally includes a ball check chamber 50 and tubular stem 52 having an outward annular flange 54. The chamber encloses the usual check ball 56. The lower end of the stem 52 has a reduced zone 53 on its inside surface (FIG. 6) and is formed in its mouth with a chamfer 55. Below the flange 54 the stem 52 is slidingly received in the central sleeve 34 of the retainer 32. The usual dip tube 58 extends up the lower end of the tubular stem 52.

In the area of the sleeve 34 the stem 52 (FIG. 3) may be formed with inward longitudinal grooves 60 (FIG. 3) which permit venting of the atmosphere into the container 42 in a well known manner when the piston is raised. Above the grooves 60 the stem may be formed with a peripheral stop rib 62 which engages the central sleeve 34 to limit downward movement of the piston.

A trigger 64 is pivotally secured between trunions 66 extending inward from opposite walls of the housing portion 16. The trigger includes a trigger lever 68 and a rearwardly extending arm 70 bifurcated to provide spaced legs 72 which straddle the stem 52 and engage the piston cup 48 to raise the piston in the usual way when the trigger lever is pulled rearward.

Referring now to an area of novelty of the invention, a combined spring and gasket 80 is disposed about the lower end of the stem 52. It comprises (FIG. 4) an upper gasket ring 82 and a lower smaller attachment ring 84 disposed coaxially below the upper ring.

Formed integrally, the spring/gasket also includes at least a partial wall comprising in the embodiment shown the partial wall sections 86 disposed circumferentially of the spring/gasket with openings 88 inbetween. In contrast, the wall may be continuous with no openings. The stiffness and the resilience of the spring portion of the bowl can be tailored by the presence or absence of openings and their size and shape.

In the preferred embodiment shown in the FIGS. 1 through 7 disclosure, openings are shown between the partial wall sections 86. These sections are attached to the upper ring 82 inward from the periphery of the ring to leave a substantial gasket flange 90 as shown in FIG. 5. The lower attachment ring 84 is formed with a stem attachment.

The preferred form of attachment is disclosed in FIG.5. In it ring 84 comprises an axially disposed sleeve 94 which is formed with a lead-in 96 at its upper end. At its lower end the sleeve is formed with an integral upward cone-shaped web 98. The web is formed with slots 100 at its upper end to give it the ability to better expand. The slots which run parallel to the axis, are distributed uniformly about the periphery of the upper end. At its lower end the cone-shaped web is provided with a chamfer 102. Between them, the sleeve and cone-shaped web define an annular V-shaped trough 104. The sleeve 94 and cone-shaped web 98 are integral with the other elements of the spring/gasket 80.

The partial wall sections 86 are thickened inwardly at their opposite margins by ribs 106 (FIG. 4) which extend along from the lower ring 84 to the upper ring 82. It will be understood that the optimum thickness of the ribs 106 and the lateral extent of the partial wall sections 86 may be readily determined empirically. In one embodiment there are three wall sections, uniformly positioned about the spring/gasket 80, each extending for 90 degrees with the three openings between the wall sections 86 evenly taking up the balance of the circumference. This makes a kind of bowl-shaped cage or open structure. The ribs 106 on the sections 86, tapering as shown in FIG. 4, may take up 12 degrees apiece.

The upper ring 82 includes the outward flange 90 which serves as the gasket for the pump/container assembly 10/42. The top surface of the flange 90 is formed with a number of concentric grooves 108 (FIG. 4) to assist in forming a seal with the underside of the top wall 40 of the cap.

The assembly of the cone-shaped web 98 onto the stem 52 is effected after the pump is assembled onto the cap 38. The spring/gasket 80 is first received into the cap 38 with the upper flange 90 engaging the bottom surface of the top wall 40 of the cap. In this process the lower end of the stem 52 is maneuvered into the trough 104 between the sleeve 94 and the cone-shaped web 98. The upper end of the dip tube 58 is next inserted into the lower end of the attachment ring 84, guided by the chamfer 55 on the cone-shaped web to expand, beginning at its lower end and progressing to its top. In this step the cone-shaped web 98 is expanded outwardly by the relatively stiff dip tube to be squeezed against the surface of the reduced area 53 to firmly attach the stem 52 to the spring/gasket.

The pump dispenser is next brought over the finish 44 of the container 42. The cap is then screwed on to the container in the usual way and tightened so that the gasket flange is squeezed between the underside of the top wall 40 of the cap and the top of the finish, sealing the assembly in the usual way.

Figure 2:
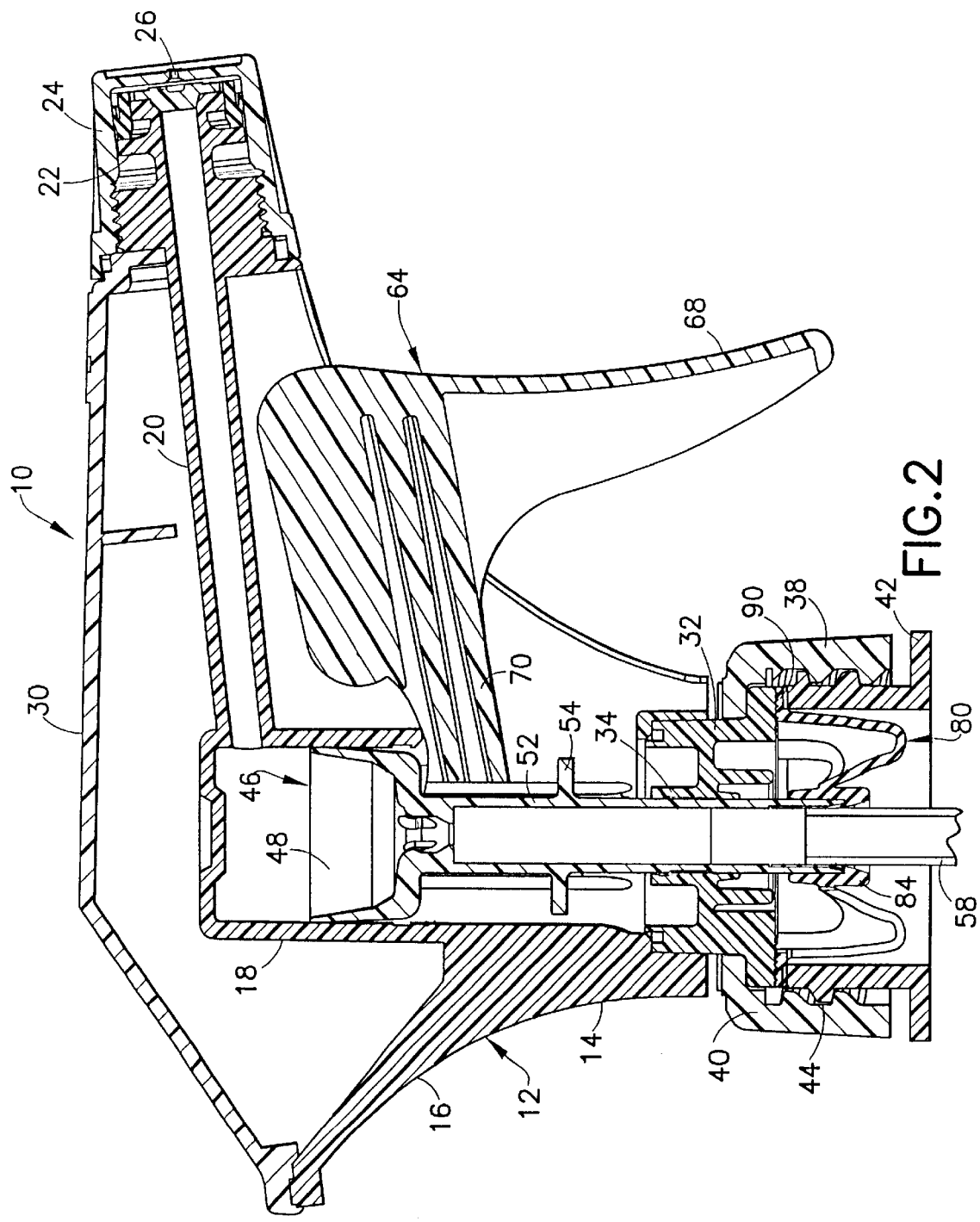
FIG. 2 is similar to FIG. 1 but showing the trigger drawn back as in use and the piston elevated.
Figure 8:
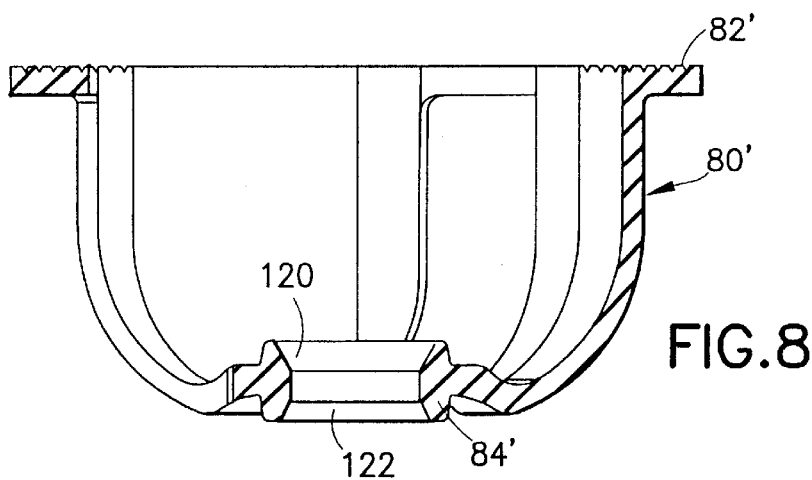
FIG. 8 is a sectional view comparable to FIG. 5 of a modified form of spring/gasket.
Figure 9:
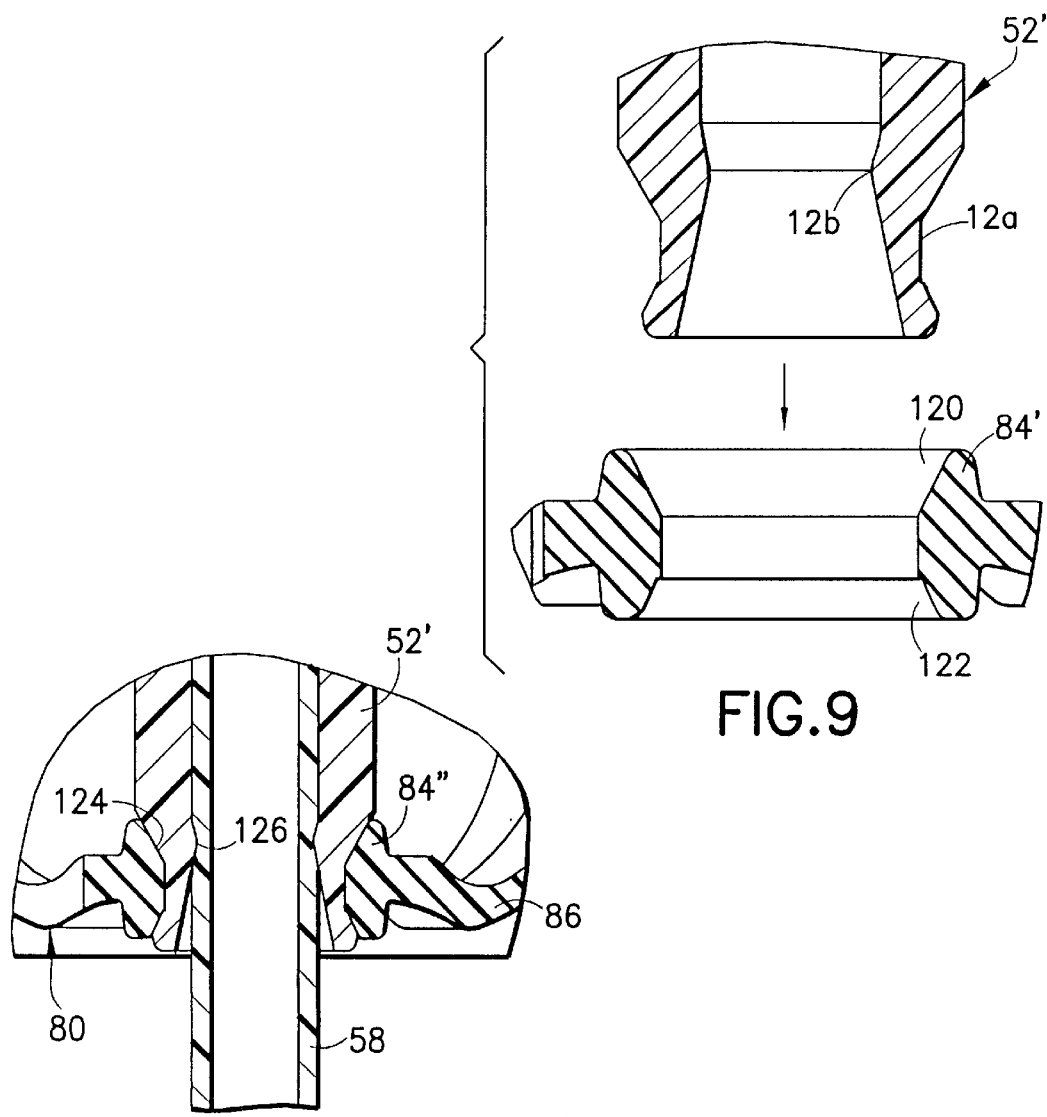
FIG. 9 is a greatly enlarged fragmentary exploded view prior to the assembly of the modified spring/gasket with the shaped lower end of the piston stem.
Figure 10:
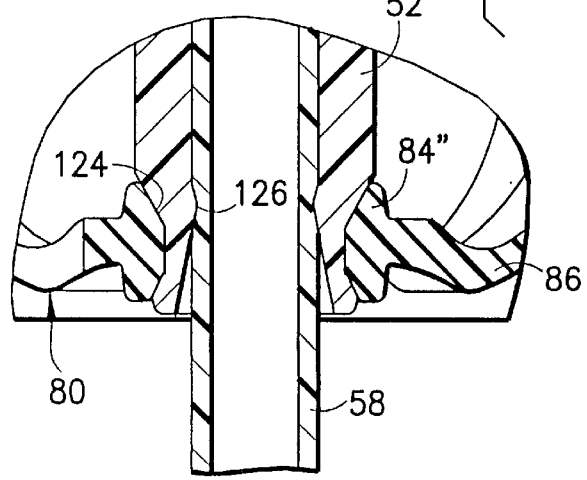
FIG. 10 is a view similar to FIG. 7 showing the modified spring/gasket assembled with the stem and the dip tube.

The operation of the dispensing pump of the invention is the same as the devices of the McKinney patent mentioned above. Instead of the internal spring of McKinney, however, the piston return function is achieved by the resilience of the plastic of the combined spring/gasket 80 of the invention. As shown in FIG. 2, the partial walls of the spring/gasket deform as the stem 52 and piston 46 are raised by the trigger. More specifically, the wall sections 86 "roll" outward, the lowest point on the wall sections moving progressively outward from the attachment as the stem raises. In raising, the piston 46 drives the liquid in the cylinder out the delivery tube 20, past the outlet check 28 and through the orifice 26. When the trigger is released, the natural resilience of the partial wall sections and ribs 106 move the attachment ring,84 and the stem 52 back down to its original level, re-enlarging the volume of the cylinder and sucking liquid up the dip tube, past the open ball check 50,56 and into the cylinder.

OTHER EMBODIMENTS OF THE INVENTION

The forms of the invention disclosed in FIGS. 8 through 10 and FIGS. 11 and 12, have to do with different embodiments of the attachment ring 84. In the FIGS. 8 through 10 embodiment the attachment ring 84' is formed with lead-in chamfers 120 and 122, respectively, in both the upper and the lower end of the ring. The lower end of the piston stem 52' is reduced in a neck 124. In assembly the ring 84' is snapped over the lower end of the stem 52' and is retained in the neck. The inside of the stem 52' may be formed with a reduced throat 126 to better grip the dip tube. In this embodiment, the resilience of the plastic ring 84' holds the attachment together. Other parts of the spring/gasket 80' may be as in the preferred embodiment.

Figure 11:
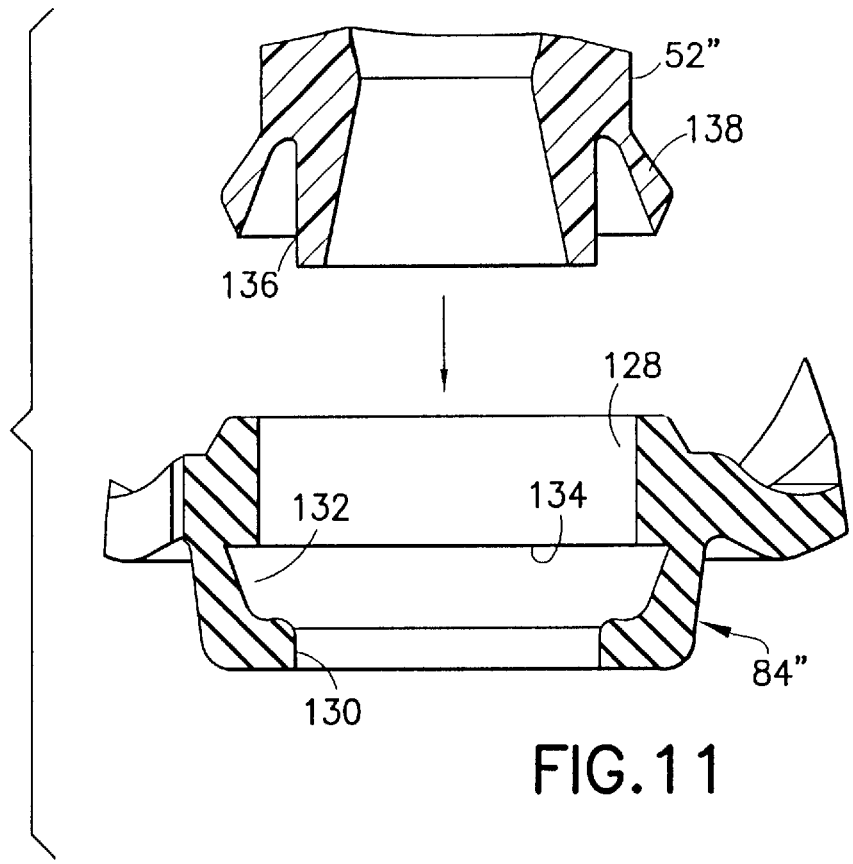
FIG. 11 is a greatly enlarged fragmentary exploded view prior to the assembly of a further modified form of spring/gasket with the shaped lower end of the piston stem.
Figure 12:
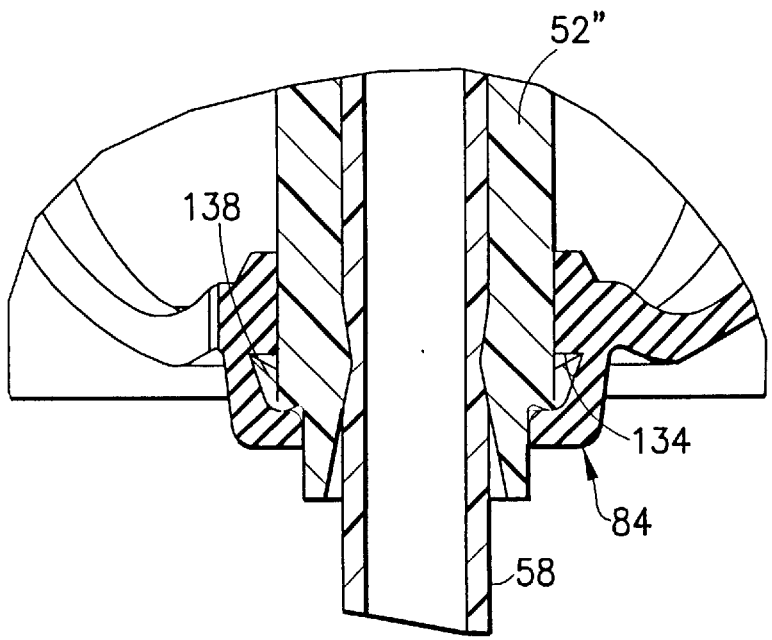
FIG. 12 is a view similar to FIGS. 7 and 10 showing the further modified spring/gasket assembled with the stem.

In the FIGS. 11 and 12 embodiment attachment ring 84" has a top opening 128, a bottom mouth 130 of reduced diameter and above the bottom mouth an undercut recess 132 having a radial downwardly facing shoulder 134. The lower end of the tubular stem 52" has a tapered portion 136 and above that an outwardly and downwardly extending frusto-conical lip 138.

In assembly, the tapered portion 136 of the stem is inserted into the opening 128 in the ring 84". The lip 138, being wider than the opening 128 in the ring, is forced to double back on itself. Further forcing of the stem 52" downward causes the doubled-back lip into the undercut 132. Any upward movement of the stem thereafter causes the distal end of the lip 138 to engage the shoulder 134 and the lip to be locked into the undercut 132. This effectively attaches the ring 84" and the stem 52".

By virtue of the structure disclosed, there is provided a pump dispenser having a combined spring and gasket. This reduces the number of parts of the dispenser and eliminates the need for the usual internal metal spring disposed in the cylinder. In reducing the number of parts, cost and time of assembly are reduced. In eliminating the internal spring, the pumping volume of the dispenser is increased and the exposure of the usual internal metal spring to corrosive liquids in some applications is obviated.

Further variations in the invention are possible. Thus, while the invention has been shown in limited embodiments, it is not so limited but is of a scope defined by the following claim language which may be broadened by an extension of the right to exclude others from making, using or selling the invention as is appropriate,under the doctrine of equivalents.

What is claimed is:

1. A pump dispenser having a downwardly facing mounting cap and comprising an inverted cup-shaped pumping cylinder enclosing a piston having a downward tubular intake stem and a resilient bowl-shaped spring/gasket having a sidewall formed with openings therein, a gasket ring about its upper end and an attachment ring disposed in its lower end, the gasket ring disposed in the cap and the attachment ring comprises a sleeve having a cone-shaped web extending upward therein to define an annular trough and the stem terminates in the trough and a dip tube extends up into the web compressing the stem between the sleeve and the cone-shaped web.

2. A pump dispenser having a downwardly facing mounting cap and comprising an inverted cup-shaped pumping cylinder enclosing a piston having a downward tubular intake stem and a one-piece resilient molded spring/gasket having a gasket ring about the upper end fitting inside the cap, and an attachment ring receiving and attached to the tubular intake stem, and at least a partial wall integral with the rings, the attachment ring including a cone-shaped web.

* * * * *